(12) United States Patent
Zheng et al.

(10) Patent No.: US 7,531,225 B2
(45) Date of Patent: May 12, 2009

(54) PREPARATION METHOD OF FUNCTIONAL MASTER BATCH OF POLYOLEFIN AND ITS APPLICATION

(75) Inventors: Anna Zheng, Shanghai (CN); Yong Guan, Shanghai (CN); Dafu Wei, Shanghai (CN); Hong Lu, Shanghai (CN)

(73) Assignees: Shanghai Sujie Science-Technology Co. Ltd., Shanghai (CN); East Chine University of Science and Technology, Shanghai (CN)

( * ) Notice: Subject to any disclaimer, the term of this patent is extended or adjusted under 35 U.S.C. 154(b) by 59 days.

(21) Appl. No.: 11/751,894

(22) Filed: May 22, 2007

(65) Prior Publication Data

US 2007/0270552 A1    Nov. 22, 2007

Related U.S. Application Data

(60) Division of application No. 10/941,626, filed on Sep. 15, 2004, now Pat. No. 7,282,538, which is a continuation of application No. PCT/CN03/00183, filed on Mar. 14, 2003.

(30) Foreign Application Priority Data

Mar. 15, 2002    (CN) .................................. 02 1 11048

(51) Int. Cl.
*C08L 23/36* (2006.01)
*B29D 22/00* (2006.01)

(52) U.S. Cl. ................... 428/35.7; 293/102; 525/69; 525/185; 525/186; 525/190; 525/330.7; 525/331.4; 525/340; 525/374

(58) Field of Classification Search ................ 525/69, 525/185, 186, 190, 330.7, 331.4, 340, 374; 428/35.7; 293/102; 446/1
See application file for complete search history.

(56) References Cited

FOREIGN PATENT DOCUMENTS

| GB | 231805 | 11/1925 |
|----|--------|---------|
| GB | 818844 | 8/1959 |
| GB | 1 581 205 | 12/1980 |

*Primary Examiner*—Ana L Woodward
(74) *Attorney, Agent, or Firm*—Dorsey & Whitney LLP

(57) ABSTRACT

The present invention belongs to the field of polymerization and processing of polymer and relates to the preparation of a kind of functional polyolefin master batch. The functional master batch is produced by liquid phase, melt phase, or solid phase reaction after mixing the polyolefin resin, polyamine and guanidine salt oligomer, olefin monomer and initiator. The molecular structure of functional polyolefin master batch is shown below:

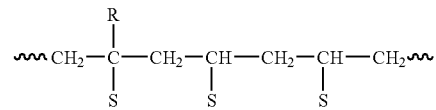

wherein R is a polyamine and guanidine salt oligomer bonded onto polyolefin molecular chain by covalence bond, while S is one selected from hydrogen, chlorine, methyl, or phenyl group.

Blending mentioned functional master batch with the corresponding polyolefin, the various antimicrobe products, such as fibers, film, pipe and other plastic articles can be obtained. Besides endowing products with excellent permanent antimicrobe property, it also provides fibers with good-dyeable and antistatic ability and bumpers with easy-paintable ability.

3 Claims, No Drawings

PREPARATION METHOD OF FUNCTIONAL MASTER BATCH OF POLYOLEFIN AND ITS APPLICATION

CROSS-REFERENCE TO RELATED APPLICATIONS

This application is a divisional application of and claims priority to U.S. application Ser. No. 10/941,626, filed Sep. 15, 2004, which is a continuation of and claims priority to International Application No. PCT/CN03/00183, filed on Mar. 14, 2003, which claims priority to Chinese Patent Application No. 02111048.4, filed on Mar. 15, 2002, the contents of which are incorporated in their entirety by reference.

TECHNIQUE FIELD OF THE INVENTION

The present invention belongs to the field of polymerization and processing of polymer and relates to the preparation of a kind of multifunctional antimicrobial oligomer containing the reactive double bond, amino group and guanidyl group and the functional master batch formed by the bonding reaction of the oligomer with polyolefin (named molecule assembling technique). By means of blending the functional master batch with a normal polyolefin by a certain ratio, one can prepare various fibres and plastic products with the broad-spectrum antimicrobial ability, improving antistatic ability, dyeability as well as paintable ability.

BACKGROUND OF THE INVENTION

Antimicrobial material, obtained by adding one or more specific antimicrobial agents, is a kind of novel functional material which can inhibit or sterilize microbe. Since antimicrobial materials appeared in the market, they have developed quickly and become very popular because various synthetic materials and products are applied widely in everyday life. A CBS survey made in 1997 showed that people in Euro-American countries pay more and more great attention to the antimicrobial function of commodities. 52% of Americans will pay attention to whether the products they need have antimicrobial properties and deodorizing abilities when they purchase the commodities. The antimicrobial products are initially applied in the developed countries, such as Japan as well as Europe and America. It is since 1990's that the antimicrobial products have entered into a booming stage along with the fast development of economy and improvement of living standards in China. The development and application of the antimicrobial materials have become a green barrier to protect human health, which they have a great significance of improving living environment as well as diminishing the diseases of human being. Therefore, antimicrobial modification for various raw materials has become a new trend in material industries, thereof the antimicrobial products have great market demands and a prosperous future.

The prior technique of antimicrobial materials have come into practical application in the form of antibiotic fibre products since 1960s, and have been used in antimicrobial plastics since the early 1980s, since then they have experienced fast development with their application in various industries, such as chemical engineering, fibres, food, electrical appliance and cement, covering almost all major kinds of fibres and plastics products, such as Dacron, polypropylene fibres, Acrylon, PP, ABS, PE, and PVC, etc, Since 1990's, antimicrobial materials have developed into a giant industry.

Antimicrobial agents can be divided into three kinds according to their chemical composition; inorganic, organic and natural ones. As for the natural antimicrobial agents, they can not be industrialized for the limitation of sources and processing condition. With regard to organic antimicrobial agents, they have high efficiency and broad-spectrum antimicrobial ability, but they also have problems, such as poor thermal stability, toxicity, easiness of seepage and dissolution, short usage life time and poor wash resistance, so their application are greatly limited. Inorganic antimicrobial agents, particularly silver-series agents, characterized by safety, thermal stability, and durability, become widely applicable and acceptable antimicrobial agents in fibres, plastics and building materials with deficiency of higher price and slow-effectiveness. They can not be used efficiently like organic antimicrobial agents, moreover, they have poor effects on fungi and mould. Meanwhile, silver is chemically active, so is easily oxidized into silver oxide in brown color, leading to deteriorate the antimicrobial ability as well as stain on the appearance of the products. On the other hand, the poor compatibility of inorganic antimicrobial powder with macromolecular materials will cause agglomeration in matrix resin, resulting in difficulties in spinning and drawing. Inorganic antimicrobial agents play their role by releasing heavy metallic ions which are not conformable to the National Hygienic Standard concerning foods and packing materials, thereby mentioned agents can not be used in materials for food packing, kitchen wares and drinking water pipes, etc.

The British Patent GB 2,182,245 discloses polyhexamethylene biguanide being used as an antimicrobial agent. The same with this, polyhexamethylene biguanide used as decontaminant in water treatment, characterizing good water solubility and high safety for environmental protection are disclosed in Japanese Patents JP 05,209,195, JP 05,209,197, and JP 05,209,196.

U.S. Pat. No.4,891,423 discloses polyoxyethylenediamine biguanide being used as water-soluble antimicrobial liquor for contact lenses which proves that such an antimicrobial agent has a superior safety for human.

Russian Patent RU 2,052,453 and SU 1,750,979 disclose polyethylene diamine biguanide being used as an antimicrobial agent in water treatment and stuff added into pigment for oil painting protection.

In summary, polymer material containing guanidyl groups is a kind of effective antimicrobial agent, and can be used as water purificating agent because of its good water-soluble property. However, water-soluble property contrarily becomes retardation for its application as an antimicrobial modifier in the areas of plastics, fibres, rubber, and coating materials. Therefore, it is very important that further modification of the polymer containing guadinyl groups is needed in order to have more industrial value and wider application.

CONTENTS OF THE INVENTION

The objective of the present invention is to overcome the deficiency existing in prior art and to provide master batch of polyolefin material with superior properties such as antimicrobial ability, antistatic ability, dye ability, and easy-to-coat ability as well as a method of producing the same and application thereof.

The objective of this invention can be implemented through the technical scheme as follows:

Functional master batch of polyolefin, characterized by its molecular structure shown below:

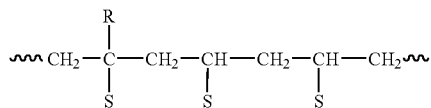

wherein R is a polyamine and guanidine salt oligomer bonded onto polyolefin molecular chain by covalence bond, while S is one selected from hydrogen, chlorine, methyl, or phenyl group.

Mentioned polyamine and guanidine salt oligomer is composed as the following molecular structure:

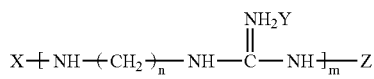

wherein $n=2-20$, $m=2-300$, Y is one from $Cl^-$, $Br^-$, $NO_3^-$, $HCO_3^-$, or $H_2PO_4^-$, X is $C_3-C_{20}$ acryl or ester group containing 1-5 active unsaturated double bond(s), and Z is hydrogen or X.

Mentioned X is one selected from actyloyl, methacryloyl, maleoyl, fumaroyl, itaconoyl, undecynoyl, and hydroxypropyl methacrylate.

A process to produce functional master batch of polyolefin, characterized in that mentioned process is carried out by liquid phase, melt phase, or solid phase reaction and the reactant and the amount (by weight) listed below:

(1) 60%-98% polyolefin resin whose brand is determined by requirements of final product. For example, to produce antimicrobial polypropylene fibres, polypropylene resin is needed.

(2) 2%-40% polyamine and guanidine salt oligomer with its molecular weight ranging from 300 to 60,000. If the content of mentioned oligomer is less than 2.0%, it can not reach the goal as less polar groups existing in such obtained master batch, however, if the content of oligomer is more than 40%, it will cause crosslinking of polyolefin resin, thereby reducing flowability and spinnability of the functional master batch, and in another aspect cause a large amount of ungrafted polyamine and guanidine salt oligomer remaining in the master batch, resulting in breakoff of spinning, and also increasing the cost of the master batch.

(3) 0.5%-15% olefin monomer, such as styrene, divinylbenzene, α-methyistyrene, etc. The amount of mentioned olefin monomer is between 0.5%-15.0%. If the amount of olefin monomer is less than 0.5%, the effect on increase of grafting rate can not be achievable, however if the amount is more than 15.0%, it will result in olefin homopolymerization, or lead to crosslinking.

(4) 0.01%-5.0% initiator, such as 2,5-dimethyl-2,5-di(t-butyl peroxy) hexane, 2,5-dimethyl-2,5-di(t-butyl peroxy) hexane-3, isopropyl benzene hydroperoxide, benzoylperoxide, dodecanoyl peroxide, di-t-butyl isopropyl benzene peroxide, t-butyl peroxyacetate, t-butyl 2-ethylcaproate peroxide, 2,5-dimethyl-2,5-di(benzoyl peroxy)hexane, t-butyl isopropyl benzene peroxide, 2,4-dichlorobenzoyl peroxide, p-chlorobenzoyl peroxide, t-butyl peroxylaurate, peroxysuccinic acid, hydroxycyclohexyl hydroperoxide, 1,1-di(peroxy-t-butyl)-3,3,5-trimethyl cyclohexane, 4,4-di (peroxy-t-butyl)n-butyl valerate, t-butyl hydroperoxide, t-butyl peroxybenzoate etc. If the amount of the initiator is less than 0.01%, the grafting rate of polyamine and guanidine salt oligomer would be dramatically reduced because the concentration of free radical is too low. However, if the amount is more than 5.0% by weight, the terminating reaction between free radicals will increase, resulting in the decrease of grafting rate as well as causing matrix degradation and crosslinking reaction.

The initiator may be used alone or in combination of two or more.

Note: (3) and (4) are counted on the basis of total amount of (1)+(2).

Mentioned polyamine and guanidine salt oligomer is prepared by the steps below: mixing polyamine with guanidine salt by the molar ratio of 1:0.1-3.0, preferably 1:0.5-1.5, adding them into a reactor, heating to 90-150° C. and reacting for 0.5-8 hs, then raising the temperature to 160-250° C. and reacting for 1-10 hs, adding a certain amount of $C_3-C_{20}$ organic compound containing 1-5 reactive unsaturated double bond(s) into the system to form the polyanline and guanidine salt oligomer after 10-120 min reaction. The reaction equations are shown as follows;

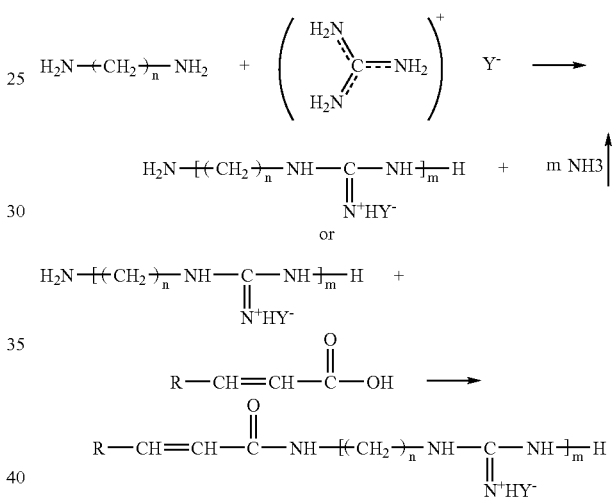

wherein R is $C_1-C_{15}$ alkyl.

Mentioned polyamine is $C_2-C_{20}$ organic amine preferably selected from the group consisting of ethylenediamine, propylene diamine, 1,6-hexanediamine, 1,10-decanediamine, hexamine, tetraethylenepentamine, triethylenetetramine, triethylenediamine, triethylenetriamine, N-hydroxyethyl-ethylenediamine, 3-dimethylamino-propylamine etc;

Mentioned guanidine salt is a salt of inorganic acid selected from guanidine carbonate, guanidine hydrochloride, guanidine nitrate, guanidine phosphate, aminoguanidine bicarbonate etc.

Mentioned $C_3-C_{20}$ compound containing 1-5 active unsaturated double bond(s) is one preferably selected from acrylic acid, methacrylic acid, methyl methacrylate, ethyl methacrylate, butyl acrylate, ethyl acrylate, 2-hydroxyethyl acrylate, 2-hydroxypropyl acrylate, undecylenic acid, glycidyl methacrylate, glycidyl acrylate, 2-hydroxypropyl methacrylate, maleic anhydride, fumarate, itaconic acid, sorbic acid etc.

Generally, the functional master batch of polyolefin is produced by liquid phase, melt phase, or solid phase reaction as follows:

(1) Liquid Phase Reaction Process

Adding various raw materials into the xylene as a solvent, gradually heating to 90-125° C. to form 5-55% solution and reacting for 3-4 hs, After the completion of the reaction, cooling to a room temperature and precipitating the solid, the functional master batch are then obtained after filteri filtering and drying the solid to obtain the functional master batch.

(2) Molten Phase Reaction Process

Adding various raw materials into a single screw extruder, or a twin screw extruder, or a Banbury mixer, carrying on the bonding reaction at 170-260° C. for 1-25 min. Upon completion of the reaction, the functional master batch are finally obtained after the product is pulverized, extracted with water or acetone to remove ungrafted polyamine and guanidine salt oligomer. Then obtain the functional master batch after drying.

(3) Solid Phase Reaction Process:

Firstly pulverize the polyolefin resin into powders in 40 mesh or more. Mix the polyolefin powder and other raw materials into a blender with high rpm for homogeneously blending, transfer the mixture into an autoclave equipped with a screw agitator, heat to 90-145° C. and simultaneously stirring for 1-8 hs. The functional master batch are finally obtained after the product is extracted with water or acetone, and dried.

An application of polyolefin master batch as the modifier for fibres, is characterized in that the polyolefin master batch are mixed with polypropylene (PP) or polyethylene (PE) chips by a certain ratio, thereby spinning and getting the good-dyeable, excellent antimicrobial and antistatic fibers or non-woven fabrics.

An application of polyolefin master batch as the modifier for PP car bumper, is characterized in that the polyolefin master batch are mixed with PP special chips by a certain ratio, thereby producing easy-paintable PP car bumpers.

Other applications of polyolefin master batch are characterized in that, the polyolefin master batch are mixed with polypropylene (PP), polystyrene (PS), polyethylene (PE) or polyvinyl chloride (PVC) chips by a certain ratio. Then one can get various plastic products with excellent antimicrobial ability including BOPP (biaxial oriented polypropylene) film, atactic polypropylene (PPR) drinking water pipe and PE, PS (polystyrene), PVC films as well as other plastic articles.

The molecular structure of mentioned polyamine and guanidine salt oligomer can be mensurated by IR spectroscopy. The characteristic absorption peaks of guanidyl, amino, double bond, and amide are at 1633-1660 cm$^{-1}$, and 3180-3360 cm$^{-1}$, 1540-1695 cm$^{-1}$ and 665-770 cm$^{-1}$, and 1610-1655 cm$^{-1}$, respectively.

Mentioned polyamine and guanidine salt oligomer can be used as a modifier for antimicrobial agent, antistatic agent or dye-site provider for synthetic fibres, being added into other polymers in an amount of 2-40% by weight. If the amount of mentioned oligomer is less than 2.0%, it can not reach the goal for inadequate polar groups existing in such obtained materials, however, if the amount of is more than 40%, it will cause crosslinking of resin, thereby reducing a processing ability of the resin. On the other hand, it will cause a large amount of unbonded polyamine and guanidine salt oligomer remaining in resin matrix, resulting in break-off at spinning, and also increasing the cost.

The molecular weight of mentioned polyamine and guanidine salt oligomer can be mensurated by VPO (Vapour Pressure Osmometer) or MS (Mass Spectra) methods. Mentioned molecular weight ranges from 300 to 60,000. There may be two circumstances happening if the molecular weight is less than 300, one is that amino content in polymer will be too low, the other is that the bonding rate will reduce, thereby both situations will cause the deterioration of modification effect. However, if the molecular weight is greater than 60,000, it will increase viscosity of the molten polymer, cause the crosslinking reaction and reduce the processibility. Accordingly, the molecular weight of the polyamine and guanidine salt oligomer preferably ranges from 300 to 60,000.

The beat resistance of mentioned polyamine and guanidine salt oligomer is measured by TGA (Thermogravimetric Analysis). The polymer of this invention has excellent heat resistance and its decomposing temperature is higher than 360° C. It will not be decomposed in a normal processing condition. In addition, it has shown a high reactivity. Antimicrobial master batch can be manufactured by reacting oligomer with polyolefin resin through melt, liquid and solid phase.

Different from the prior technique, the present invention uses a kind of molecular assemble technique to produce novel macromolecular functional master batch, so-called molecular assemble technique herein means part of molecular chain of the matrix resin is assembled with a preferred functional group through chemical bonds, thereby providing the part of resin itself with antimicrobial, antistatic properties. In comparison to antimicrobial product produced by conventional blending technique, molecular assembling technique fundamentally overcomes the lacunae of prior technique, such as poor safety for human being, inferior washable durability and etc for small molecules of organic antimicrobial agents. The products with antimicrobial functional groups which are firmly linked with matrix resin molecule through chemical bonds, so can endure wash with detergent and more safety without toxicity. At the same time, the functional master batch has excellent compatibility with resin matrix and excellent processibility, particularly suitable for more complicated process, such as producing fine filament and biaxial stretching film. In addition, the safety of the materials ensure their applications in food packing materials and drinking water pipe materials, where the ordinary antimicrobe materials containing organic and inorganic antimicrobial agents can not compete.

In this invention, we have selected guanidine salt and its derivative as major functional groups for assembling because they are important raw materials for producing sulfadiazine, sulfadimidine, and the like. These medicine have broad-spectrum antimicrobial, safe, and excellent thermal stability. In addition, guanidine salt and its derivative have strong polar and moisture adsorbability, they can be used as antistatic agents for synthetic fibres. Besides the antimicrobial ability, the assembled functional groups benefit the materials with improvement for other functions. Compared to the matrix resin, mentioned antimicrobial functional groups have much stronger polar, and easily enriched on the surface during the processing. So on one hand the efficiency increase, on the other hand, the surface electric resistivity reduce, and the antistatic ability of materials is improved. Because the polar groups can combine with dye or paint molecules, the problems in dyeing and painting for polyolefin can be solved to a certain extent. Because of the difference in polarity, the antimicrobial groups can act as nucleating agents, increasing the rate of crystallization and reducing the grain size. So the mechanical performance of materials can be also improved to a certain extent.

Mentioned functional master batch are blended with the corresponding polyolefin to obtain polypropylene fibre having better dyeability, antimicrobial ability, and antistatic ability; and car bumper with easy-paintable property, antimicrobial PPR water pipe, PP, PE, or PVC film, electrical appliance, toys and etc. Specific applications will be explained in detail with reference to the following examples.

DETAIL DESCRIPTION OF THE EMBODIMENTS

The present invention will be explained in detail with reference to the following Examples, in which the follow measure methods are used:

| Antimicrobial ability | Antimicrobial plastics, reference to GB15979-1995 Antimicrobial fibres, reference to FZ/T01021-1992 |
|---|---|
| Mould proof ability: | reference to GB/T2423.16-1999 |
| Toxicological test (Acute oral ingestion test, Dermal irritation test, micronucleus test) | reference to GB15193-1994 and GB/T17409-1998 |
| Surface electric resistivity | reference to GB1410-89 |

The assembling efficiency is measured through IR spectroscopy, by recording the relative intensities of characteristic peaks of samples taken prior and after extraction, and calculated according to the equation below:

Assembling efficiency=$C_2/C_1 \times 100\%$ wherein $C_1$ and $C_2$ are the contents (by weight) of functional groups prior and after extraction, respectively.

Dye uptake of fibres is measured by a standard method by using 721 Photometer to measure the optical density of dyebath prior and after dyeing.

$$\text{dye uptake, \%} = \frac{\text{optical density of original dyebath} - \text{optical density of raffinate}}{\text{optical density of original dyebath}} \times 100\%$$

EXAMPLE 1

172 g 1,10-decanediamine and 200 g guanidine carbonate are added into a 1000 ml three-neck flask. The mixture is heated to 110° C. with agitation for 1 hr under nitrogen gas protection, then heated to 185° C. and kept for 8 hrs. Then 35 g maleic anhydride is added into the flask and the reaction is terminated after 40 min.

The number average molecular weight of the product is 8,600 and its thermal decomposition temperature is 370° C. The characteristic absorption peaks corresponding to guanidyl, amino, amido and double bond, can be found respectively on the IR spectrum of the product.

EXAMPLE 2

100 g hexamethylenetetramine and 35 g guanidine hydrochloride are added into a 250 ml three-neck flask. The mixture is heated to 150° C. with agitation for 5 hrs under nitrogen gas protection, then heated to 230° C. and kept for 8 hrs. Then 20 g butyl acrylate is added into the flask and the reaction is terminated after 100 min.

The number average molecular weight of the product is 16,600 and its thermal decomposition temperature is 366° C. The characteristic absorption peaks corresponding to guanidyl, amino, amido and double bond, can be found respectively on the IR spectrum of the product.

EXAMPLE 3

210 g hexanediamine and 210 g guanidine nitrate are added into a 500 ml three-neck flask. The mixture is heated to 100° C. with agitation for 2 hrs under nitrogen gas protection, then heated to 160° C. and kept for 1 hr. Then 10 g glycidyl methacrylate is added into the flask and the reaction is terminated after 20 min.

The number average molecular weight of the product is 800 and its thermal decomposition temperature is 365° C. The characteristic absorption peaks corresponding to guanidyl, amino, amido and double bond, can be found respectively on the IR spectrum of the product.

The following examples are used to illustrate the process of producing functional master batch:

EXAMPLE 4

80 g polypropylene Y2600 (available from Shanghai Petrochemical Co. Ltd.), 20 g maleic acid ester of polydecamethylenediamine-guanidine carbonate with a molecular weight of 50,000, 4 g of styrene, and 1.3 g of benzoyl peroxide are and 1300 g of xylene added into a 2000 ml flask. The mixture is heated gradually to 110° C. After all solids are dissolved, the reaction is kept for 4 hrs. The reaction is finished and the reactant is cooled to room temperature, then 100 g acetone is added into the flask to make the solid completely precipitate from the solution. The functional master batch of polypropylene is obtained after filtering and drying. (with Code No. 1).

The assembling rate measured by IR spectroscopy is 96.6%.

EXAMPLE 5

100 g powdered polyvinyl chloride TH-5 (available from Tianjin Chemical Plant) into a homo-mixer, followed adding 25 g of methacrylate of polyhexanediamine-guanidine hydrochloride with a molecular weight of 1,500 and 7 g of divinylbenzene are transferred into into an 1000 ml reactor equipped with a belt-screw propeller. The mixture is heated to 100° C. under agitation. 1.0 g of t-butyl acetate peroxide and 0.3 g of t-butyl hydro peroxide are divided into 5 portions respectively and matched every portion of both as a pair. The pairs are added into the reactor in 5 times within 3 hs to initiate the reaction of chemical bonding on the polymer chains. After the reaction reaches completed, the powder is extracted in a Soxhlet extractor with acetone for 10 hs. The functional master batch is obtained after drying. (with Code No. 2).

The assembling rate measured by IR spectroscopy is 92.6%.

EXAMPLE 6

2.5 kg of polystyrene Tororex with melt flow index of 8 g/10 min (available from Mitsuyi Toatsu Chemical Corn. Japan), 630 g of acrylate of polyethylenediamine-guanidine hydrochloride with molecular weight 16,000, 130 g of α-methyl styrene, 0.8 g of diisopropylbenzene peroxide, 4 g of lauroyl peroxide are added into a homo-mixer, blended for 5 min and transferred into a Φ 35 twin-screw extruder to reactively extrude the material in 50 rpm at 190° C. The extruded product is pulverized and extracted with acetone for 10 hs. The functional master batch is obtained after drying. (with Code No. 3).

The assembling rate measured by IR spectroscopy is 73.2%.

The following Examples are used to illustrate the effective applications of functional master batch of polyolefin obtained from above.

EXAMPLE 7

The reference sample obtained from polypropylene Y1600 (available from Shanghai Petrochemical Co. Ltd.,) is labeled as A.

The sample obtained from blending 4.8 kg of polypropylene Y1600 with 200 g of No. 1 functional master batch is labeled as A'.

Both samples are spinned respectively at 260° C. to get polypropylene fibers. The mechanical properties and dyeability of both fibers are listed below:

| Sample No. | Tensile strength N/dtex | Breaking elongation, % | Dye ability, % disperse blue | Anti-soap washing ability | Dye ability, % acid blue | Anti-soap washing ability | antimicribial efficiency, % (*Staphylococcus aureus*) |
|---|---|---|---|---|---|---|---|
| A  | 3.8 | 112 | 6.1 | —  | 0  | —   | —  |
| A' | 3.2 | 128 | 82  | 4  | 86 | 4-5 | 90 |

EXAMPLE 8

The reference sample obtained from atactic polypropylene RA-130E (available from Northern Europe Chemicals Co. Ltd.) is labeled as B.

The sample obtained from blending 19 kg of RA-130E with 1.5 kg of No. 1 functional master batch is labeled as B'.

Both examples are extruded respectively into drinking water pipes with different specification. The mechanical properties and antimicribial ability of both samples are listed below:

| Sample No. | Tensile strength MPa | Breaking elongation % | Notch impact strength kJ/m² | Surface resistivity (relative humidity 70%) | antimicribial efficiency % (*Staphylococcus aureus*) | Mould resistance glad |
|---|---|---|---|---|---|---|
| B  | 26.0 | 560 | 5.2 | $1.5 \times 10^{16}$ | —  | 2 |
| B' | 26.5 | 550 | 5.3 | $5.2 \times 10^{10}$ | 87 | 0 |

The toxicological test with Sample B' has been carried out. The results of non-toxicity, non-mutagenicity and non-irritation were obtained from the oral ingestion test and in vivo micronucleus test with Kunming mouses and irritation test with rabbits using abstracted liquor, which showed the product of the present invention can be used as food packing and drinking water pipe materials.

EXAMPLE 9

The reference sample obtained from film grade polypropylene F1001 (available from Yanshan Petrochemical Co.) is labeled as C.

The sample obtained from blending 9.5 kg of F1001 with 350 g of No. 1 functional master batch is labeled as C'.

25 μm thickness films are manufactured from both samples by biaxial elongation. The properties of both samples are listed below:

| Sample No. | Tensile strength, MPa | | Breaking elongation, % | | antimicribial efficiency, % (*Staphylococcus aureus*) | Mould resistance glad |
|---|---|---|---|---|---|---|
|  | longitudinal | lateral | longitudinal | lateral | | |
| C  | 165 | 91 | 23 | 106 | —  | 2 |
| C' | 172 | 95 | 21 | 98  | 95 | 0 |

EXAMPLE 10

There are two formulas of polypropylene car bumper. Formula D is composed of polypropylene, rubber and additives and Formula D' is the same as formula D except adding 5% of No. 1 functional polypropylene. Both samples were processed through mix and extrusion through a twin-screw extruder. Then they are molded into sheet with an injector, treated with surfactant, dried, painted. The mechanical properties and adhesive strength of coating film were measured and the results are listed below:

| Sample No. | Tensile strength, MPa | Bending strength, MPa | Bending modulus, GPa | Impact strength, J/m | adhesive strength $(N \cdot M^{-1})$ | Adhesive strength after immersion in water for 48 hs $(N \cdot M^{-1})$ |
|---|---|---|---|---|---|---|
| D | 18.00 | 19 | 0.588 | Not broken | 168 | 102 |
| D' | 18.33 | 19 | 0.628 | Not broken | 619 | 432 |

EXAMPLE 11

The reference sample of spherical polyvinyl chloride TH-5 (available from Tianjin Chemical Plant) is labeled as E.

The sample obtained from blending 9.5 kg of PVC TH-5 with 500 g of No. 2 functional master batch is labeled as E'.

Both samples are molded into sheets respectively with a injector and measuring the properties of both samples. The results are listed below:

| Sample No. | Tensile strength | Bending modulus, MPa | Notch impact strength, kJ/m² | Surface resistivity (relative humidity 70%) | antimicribial efficiency % (*Staphylococcus aureus*) | Mould resistance class | antimicribial efficiency, % (*Staphylococcus aureus*) |
|---|---|---|---|---|---|---|---|
| E | 53.5 | 136 | 5.6 | $2.9 \times 10^{15}$ | — | 2 | — |
| E' | 53.8 | 150 | 5.7 | $6.7 \times 10^{10}$ | 82 | 0 | 82 |

EXAMPLE 12

The reference sample obtained from polystyrene Tororex (available from Mitsuyi Toatsu Chemical Com. Japan) is labeled as F.

The sample obtained from blending 9.5 kg of polystyrene Tororex with 500 g of No. 3 functional master batch is labeled as F'.

Both samples are molded into sheets respectively with a injector and measuring the properties of both samples. The results are listed below:

| Sample No. | bending strength MPa | Izod impact strength J/m | Surface resistivity (relative humidity 70%) | antimicribial efficiency % (*Staphylococcus aureus*) | Mould resistance glad | antimicribial efficiency % (*Staphylococcus aureus*) |
|---|---|---|---|---|---|---|
| F | 95 | 26 | $5.9 \times 10^{15}$ | — | 2 | — |
| F' | 98 | 26 | $3.7 \times 10^{10}$ | 78 | 0 | 78 |

It can be seen from the results of Examples 6-12 that adding functional master batch into polyolefin does not have any negative effects on the mechanical properties of the materials, but improve some properties slightly. The most important is that it gives the material excellent antimicribial ability and mould resistance. The effects are durable and reliable safety. It accords with the hygienic standards applied for food packing and drinking water pipe materials. Furthermore, adding functional master batch into polyolefin significantly increases the material surface polar, decreases the surface resistivity by 5-6 orders of magnitude, greatly enhances the dye-ability of polypropylene fiber to acidic dyes and dispersing dyes, and paintable ability of polyolefin materials.

Accordingly, the functional master batch produced by molecular assembling according to the present invention can improve the properties of polyolefin products in various aspects and show wide application fields.

By introducing active double bonds onto the molecular chains of oligomer produced by the reaction of polyamine and guanidine salt, the oligomer can be assembled onto the molecular chains of polyolefin though the addition reaction of double bonds, giving the material antimicribial, hygroscopic, antistatic and dyeable properties. The key point of the present invention is the synthesis of antimicrobial agent and assembling it onto matrix resin.

The invention claimed is:

1. A composition comprising:
a polymer comprising the formula

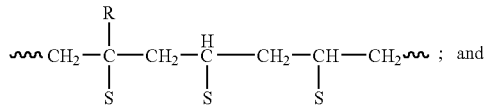; and polypropylene, polyethylene, polystyrene, or polyvinyl chloride, wherein R is

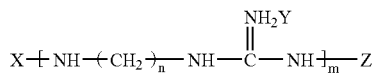

wherein
X is acryloyl, methacryloyl, a $C_3$-$C_{20}$ acryloyl ester or $C_3$-$C_{20}$ methacryloyl ester;
S is a hydrogen atom, a chlorine atom, a methyl group or a phenyl group;
n is 2-20;
m is 2-300;
Y is $Cl^-$, $Br^-$, $NO_3^-$, $HCO_3^-$, or $H_2PO_4^-$; and
Z is a hydrogen atom or X.

2. The composition of claim 1, wherein the polypropylene, polyethylene, polystyrene, or polyvinyl chloride is in chip form.

3. The composition of claim 1, wherein said composition is formed into at least one of a polypropylene based fiber, a polypropylene based car bumper, an antimicrobial polypropylene-Random (PPR) based water pipe, polypropylene (PP) based, polyethylene (PE) based, or polyvinyl chloride (PVC) based film, an electrical appliance or toys.

* * * * *

UNITED STATES PATENT AND TRADEMARK OFFICE
CERTIFICATE OF CORRECTION

PATENT NO. : 7,531,225 B2  Page 1 of 1
APPLICATION NO. : 11/751894
DATED : May 12, 2009
INVENTOR(S) : Anna Zheng et al.

It is certified that error appears in the above-identified patent and that said Letters Patent is hereby corrected as shown below:

|  | PTO | Should Read |
|---|---|---|
| On the Title page, after item [73]: | "East Chine" | -- East China -- |

Signed and Sealed this

Fourteenth Day of July, 2009

JOHN DOLL
*Acting Director of the United States Patent and Trademark Office*